(12) United States Patent
Kanehara

(10) Patent No.: US 12,013,980 B2
(45) Date of Patent: Jun. 18, 2024

(54) INFORMATION PROCESSING APPARATUS, INFORMATION PROCESSING METHOD, LEARNING METHOD, AND STORAGE MEDIUM

(71) Applicant: HONDA MOTOR CO., LTD., Tokyo (JP)

(72) Inventor: Akira Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 319 days.

(21) Appl. No.: 17/674,472

(22) Filed: Feb. 17, 2022

(65) Prior Publication Data

US 2022/0326768 A1    Oct. 13, 2022

(30) Foreign Application Priority Data

Apr. 9, 2021 (JP) ................... 2021-066697

(51) Int. Cl.
*G06F 3/01* (2006.01)
*G06V 40/16* (2022.01)

(52) U.S. Cl.
CPC ............ *G06F 3/013* (2013.01); *G06V 40/161* (2022.01)

(58) Field of Classification Search
CPC ............................... G06F 3/013; G06V 40/61
USPC ........................................................ 382/103
See application file for complete search history.

(56) References Cited

U.S. PATENT DOCUMENTS

| 9,799,332 B2 * | 10/2017 | Kim ................ G10L 15/22 |
| 11,232,584 B2 | 1/2022 | Morishita |
| 11,232,585 B2 | 1/2022 | Morishita |
| 11,232,586 B2 | 1/2022 | Morishita |
| 2007/0230797 A1 | 10/2007 | Hisanaga |
| 2020/0058136 A1 | 2/2020 | Morishita |
| 2020/0065990 A1 | 2/2020 | Morishita |
| 2020/0065993 A1 | 2/2020 | Morishita |
| 2021/0042520 A1 * | 2/2021 | Molin .................... G06V 40/18 |

(Continued)

FOREIGN PATENT DOCUMENTS

| CN | 115393388 A | * 11/2022 |
| JP | 2005-278898 A | 10/2005 |
| JP | 2007-265367 A | 10/2007 |

(Continued)

OTHER PUBLICATIONS

Office Action dated Nov. 28, 2022, issued in counterpart JP application No. 2021-066697, with partial English translation. (3 pages).

*Primary Examiner* — Gabriel I Garcia (74) *Attorney, Agent, or Firm* — WHDA, LLP (57) ABSTRACT

The present invention provides an information processing apparatus that estimates a line of sight of a person, executing a first calculation of estimating a direction of a face of the person using a first model that outputs a calculation result of the direction of the face of the person when an image of the face of the person is input; and executing a second calculation of estimating the line of sight of the person using a second model that outputs a calculation result of the line of sight of the person when an image of at least one eye of the person is input, wherein the at least one processor is configured to change coefficients of the second model to be used in the second calculation, according to the direction of the face estimated in the first calculation.

9 Claims, 5 Drawing Sheets

(56) References Cited

U.S. PATENT DOCUMENTS

2022/0327728 A1* 10/2022 Kanehara ................. G06T 7/70

FOREIGN PATENT DOCUMENTS

| JP | 2010-282339 A | 12/2010 |
| WO | 2018/078857 A1 | 5/2018 |

* cited by examiner

INFORMATION PROCESSING APPARATUS, INFORMATION PROCESSING METHOD, LEARNING METHOD, AND STORAGE MEDIUM

CROSS-REFERENCE TO RELATED APPLICATION(S)

This application claims priority to and the benefit of Japanese Patent Application No. 2021-066697 filed on Apr. 9, 2021, the entire disclosure of which is incorporated herein by reference.

BACKGROUND OF THE INVENTION

Field of the Invention

The present invention relates to a technique for estimating a line of sight of a person.

Description of the Related Art

Japanese Patent Laid-Open No. 2005-278898 proposes a technique for detecting a line of sight of a driver based on a captured image acquired by photographing an eyeball or a face of the driver. Since a line of sight of a person may change according to directions of a face of the person, a technique for accurately estimating the line of sight of the person according to the directions of the face of the person is desired.

SUMMARY OF THE INVENTION

The present invention provides an advantageous technique for improving estimation accuracy in estimating a line of sight of a person based on an image of at least one eye of the person, for example.

According to one aspect of the present invention, there is provided an information processing apparatus that estimates a line of sight of a person, comprising: at least one processor with a memory comprising instructions, that when executed by the at least one processor, cause the at least one processor to at least: execute a first calculation of estimating a direction of a face of the person using a first model that outputs a calculation result of the direction of the face of the person when an image of the face of the person is input; and execute a second calculation of estimating the line of sight of the person using a second model that outputs a calculation result of the line of sight of the person when an image of at least one eye of the person is input, wherein the at least one processor is configured to change coefficients of the second model to be used in the second calculation, according to the direction of the face estimated in the first calculation.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
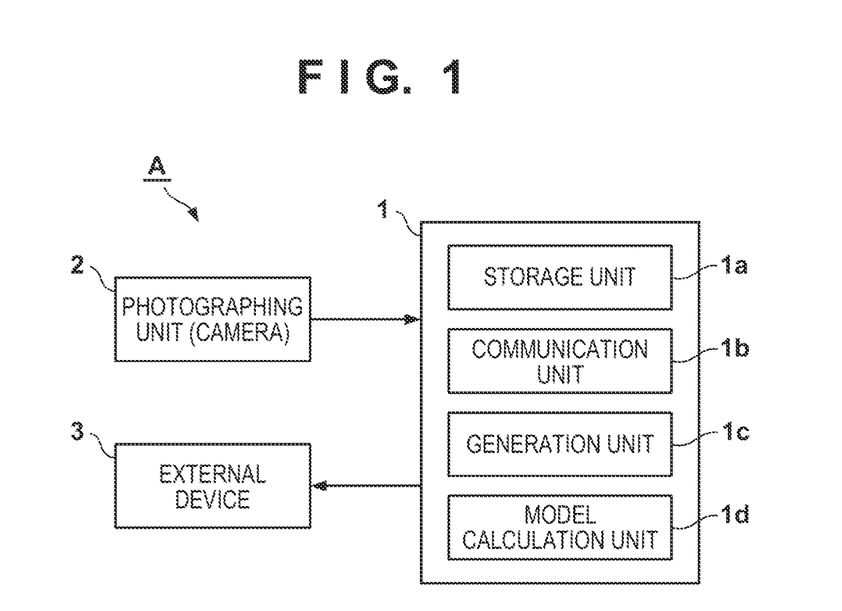
FIG. 1 is a diagram illustrating a configuration example of a system using an information processing apparatus according to the present invention.

FIG. 1 is a diagram illustrating a configuration example of a system A using an information processing apparatus 1 according to an embodiment of the present invention. The system A according to the present embodiment includes the information processing apparatus 1, a photographing unit 2 (an image capturing unit), and an external device 3. The photographing unit 2 includes, for example, a camera, and photographs a person so that a face of the person is included in an image. For example, in a case where the system A according to the present embodiment is applied to a vehicle, the photographing unit 2 can be disposed to photograph a driver seated on a driver's seat of the vehicle. In addition, the external device 3 is a device that acquires information on a line of sight of a person, estimated by the information processing apparatus 1 and performs various types of processing based on the information on the line of sight. For example, in a case where the system A according to the present embodiment is applied to a vehicle, the external device 3 is a control unit (e.g., an electronic control unit (ECU)) that controls the vehicle, and detects, based on information on a line of sight of a driver (person), estimated by the information processing apparatus 1, where the driver is facing during driving. The external device 3 may be a control unit that controls automated driving of a vehicle.

The information processing apparatus 1 is a computer including a processor represented by a CPU, a storage device such as a semiconductor memory, an interface with an external device, and the like, and executes estimation processing of estimating (determining, calculating) a line of sight of a person based on an image of the person acquired by the photographing unit 2. A "line of sight of a person" is defined as a direction in which the person is looking, and may be understood as a direction or a vector of at least one eye of the person. In the case of the present embodiment, the information processing apparatus 1 may include a storage unit 1a, a communication unit 1b, a generation unit 1c, and a model calculation unit 1d. The storage unit 1a stores a learning model, learning data, and the like to be described later in addition to programs and various data executed by a processor, and the information processing apparatus 1 can execute the above-described estimation processing by reading and executing the programs and the like stored in the storage unit 1a. Here, the programs executed by the information processing apparatus 1 may be stored in a storage medium such as a CD-ROM or a DVD and installed from the storage medium to the information processing apparatus 1.

The communication unit 1b of the information processing apparatus 1 is an interface that communicates information and data with the photographing unit 2 and/or the external device 3, and includes an input/output interface and/or a communication interface. The communication unit 1b may be understood as an acquisition unit that acquires an image of a person acquired by the photographing unit 2 from the photographing unit 2, or may be understood as an output unit (supply unit) that outputs (supplies) information on a line of sight of a person estimated by the model calculation unit 1d to be described later to the external device 3. Hereinafter, an image of a person acquired by the photographing unit 2 may be referred to as a "captured image".

The generation unit 1c of the information processing apparatus 1 applies a known image processing technique to a captured image of a person acquired from the photographing unit 2 via the communication unit 1b, thereby extracting, from the captured image, an image of a face (entire face) of the person, an image of a left eye of the person, and an image of a right eye of the person. Then, from the image of the face, the image of the left eye, and the image of the right eye each extracted from the captured image, images to be input to the model calculation unit 1d are generated. Hereinafter, an image extracted from a captured image may be referred to as an "extracted image", and an image input to the model calculation unit 1d may be referred to as an "input image".

In the case of the present embodiment, the generation unit 1c performs mirror reversal processing on one of extracted images of an extracted image of a left eye and an extracted image of a right eye, thereby inputting a reversed image acquired by mirror-reversing the one of the extracted images in a left-right direction to the model calculation unit 1d. On the other hand, the mirror reversal processing is not performed on the other of the extracted images of the left-eye extracted image and the right-eye extracted image, and an unreversed image that is not mirror-reversed in the left-right direction is input to the model calculation unit 1d. An extracted image of a face is not subjected to the mirror reversal processing, and an unreversed image that is not mirror-reversed in the left-right direction is input to the model calculation unit 1d. Hereinafter, an example in which the mirror reversal processing is performed on the extracted image of the right eye will be described. Note that a "left-right direction" can be defined as a direction in which a left eye and a right eye are aligned in a captured image of a person (i.e., a left-right direction with respect to a person).

Figure 2:
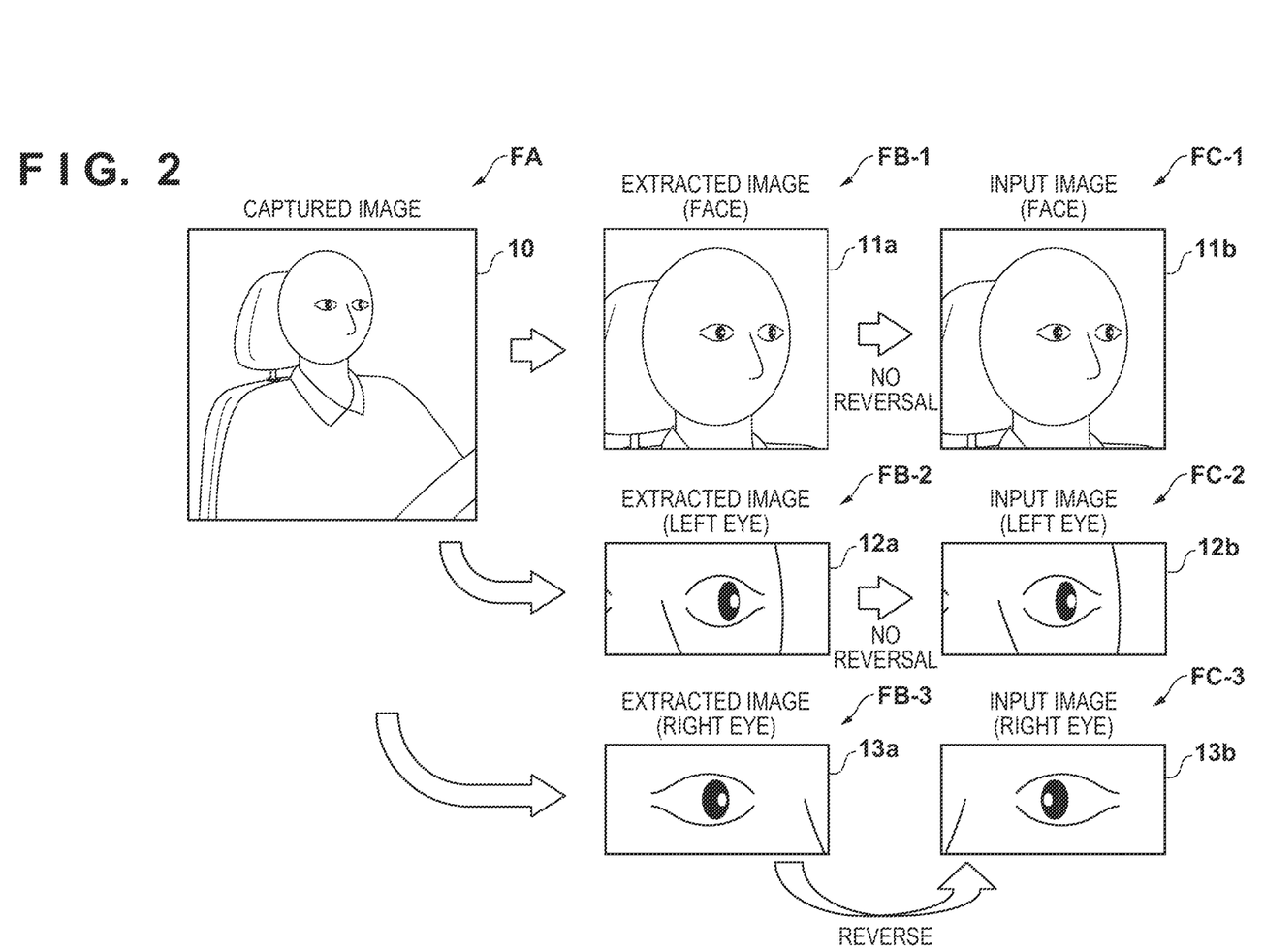
FIG. 2 is a diagram exemplifying a captured image, an extracted image, and an input image.

FIG. 2 is a diagram exemplifying a captured image, extracted images, and input images. The figure FA of FIG. 2 illustrates a captured image 10 acquired by photographing a person (driver) seated in a driver's seat of a vehicle by the photographing unit 2. The generation unit 1c acquires the captured image 10 illustrated in the figure FA of FIG. 2 from the photographing unit 2 via the communication unit 1b, and applies a known image processing technique to the captured image 10, thereby extracting a face image, a left-eye image, and a right-eye image each as an extracted image. The figures FB-1 to FB-3 of FIG. 2 illustrate an extracted image 11a of a face, an extracted image 12a of a left eye, and an extracted image 13a of a right eye, respectively. In addition, the generation unit 1c performs the mirror reversal processing on the right-eye extracted image 13a illustrated in the figure FB-3 of FIG. 2, thereby generating, as illustrated in the figure FC-3 of FIG. 2, a reversed image acquired by mirror-reversing the right-eye extracted image 13a in the left-right direction as a right-eye input image 13b. On the other hand, the generation unit 1c does not perform the mirror reversal processing (e.g., without processing) on the face extracted image 11a and the left-eye extracted image 12a to generate the extracted images (unreversed images) as input images. In other words, the generation unit 1c generates the face extracted image 11a as a face input image 11b as illustrated in the figure FC-1 of FIG. 2, and generates the left-eye extracted image 12a as a left-eye input image 12b as illustrated in the figure FC-2 of FIG. 2.

The model calculation unit 1d of the information processing apparatus 1 performs calculation of a machine learning algorithm using a predetermined learning model (neural network) to estimate (determine, calculate) a line of sight of a left eye and a line of sight of a right eye from the left-eye input image 12b and the right-eye input image 13b input by the generation unit 1c, respectively. In the present embodiment, an example in which the learning model (neural network) includes a network structure called a Convolutional Neural Network (CNN) including, for example, one or more convolution layers, a pooling layer, and a fully connected layer will be described. However, the network structure is not limited to the CNN, and may have other configurations. In addition, like a Residual Network (ResNet), a configuration further including a skip connection may be adopted. Alternatively, like an auto encoder, for example, in addition to a configuration of an encoder having a CNN structure, a configuration of a decoder may be further included. Obviously, the present invention is not limited to these structures, and other structures may be used as long as they have a structure of a neural network used for spatially distributed signals such as an image.

The model calculation unit 1d according to the present embodiment individually (independently) performs processing of estimating the line of sight of the left eye from the left-eye input image 12b and processing of estimating the line of sight of the right eye from the right-eye input image 13b using common (identical) learning models. Common learning models may be understood as that configurations and functions of learning models for estimating lines of sight from input images are common (identical), and more specifically, may be understood as that coefficients of learning models (i.e., weighting coefficients between neurons) are common (identical). A reason why common learning models can be used in this manner for the left-eye input image 12b and the right-eye input image 13b is that, as described above, one of the extracted images of the left-eye extracted image 12a and the right-eye extracted image 13a (the right-eye extracted image 13a in the present embodiment) is mirror-reversed in the left-right direction to be input to the model calculation unit 1d (learning model). Then, by using the common learning models, two extracted images (left eye and right eye) acquired from one captured image 10 can be used as input data of machine learning when the learning models are generated. More specifically, while conventionally, an extracted image of either a left eye or a right eye is used as input data from one captured image 10, in the present embodiment, two extracted images (left eye and right eye) can be used as input data from one captured image 10. Therefore, learning accuracy (line-of-sight estimation accuracy) and learning efficiency in machine learning can be improved.

In addition, the model calculation unit 1d according to the present embodiment performs calculation of a machine learning algorithm using a predetermined learning model (neural network) to estimate a direction of a face (facing direction) of a person from the face input image 11b input by the generation unit 1c. Then, the model calculation unit 1d inputs a result of the estimation of the face direction to a learning model for estimating a line of sight of each eye from the input images 12*b* and 13*b* and changes the coefficients (i.e., weighting coefficients between neurons) of the learning model. This makes it possible to accurately estimate a line of sight of each eye according to a face direction. Here, correlation between estimation results of face directions and changes in coefficients can be set by machine learning. Furthermore, as a mechanism for changing coefficients of a learning model, an Attention mechanism can be applied.

Figure 3:
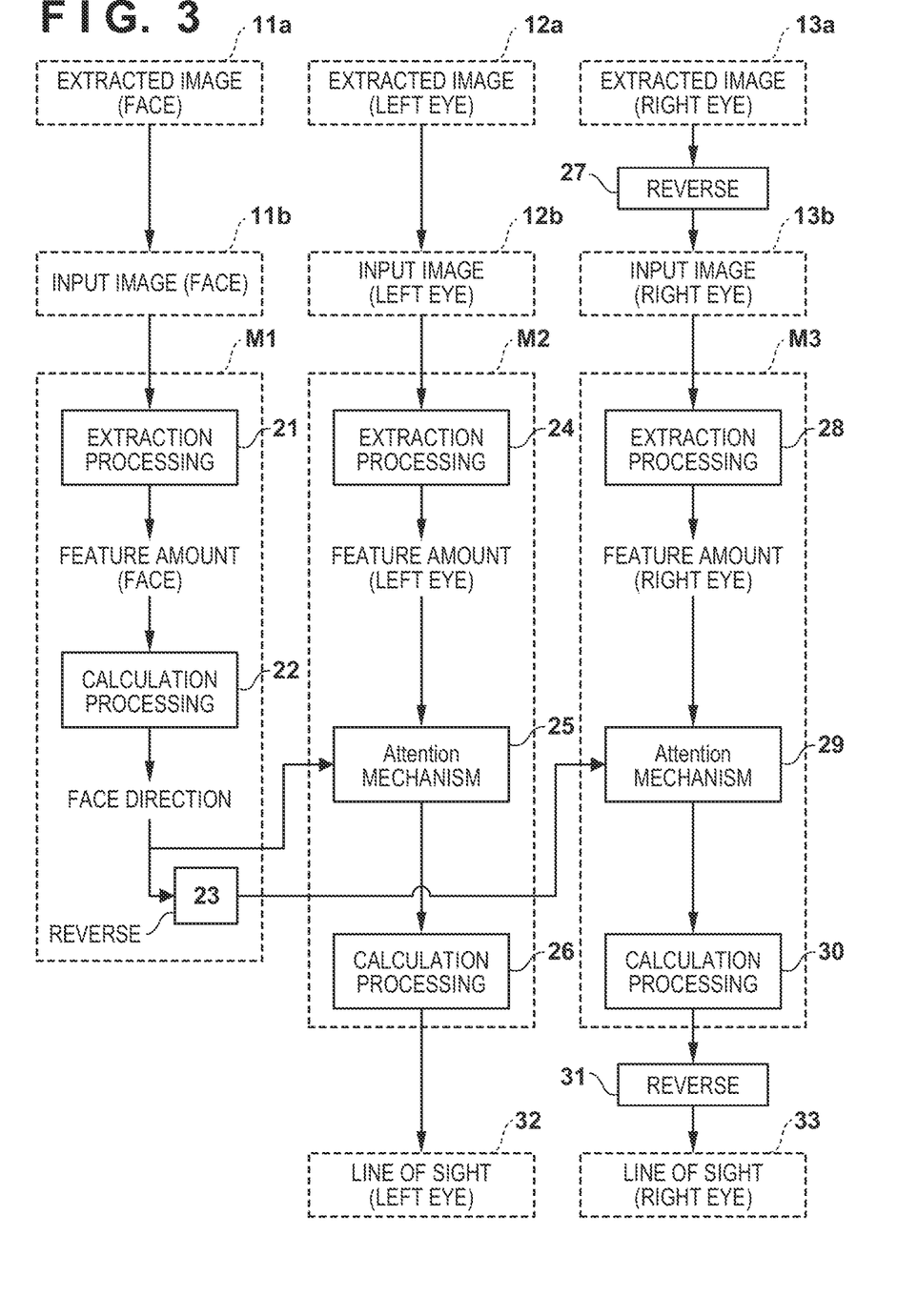
FIG. 3 is a diagram for explaining a learning model applied in an information processing apparatus.

Next, a learning model applied in the information processing apparatus 1 according to the present embodiment will be described. FIG. 3 is a block diagram for explaining a learning model applied in the information processing apparatus 1 (model calculation unit 1*d*) according to the present embodiment. As illustrated in FIG. 3, the information processing apparatus 1 according to the present embodiment can include a learning model M1 for estimating a face direction from the face input image 11*b*, a learning model M2 for estimating a line of sight of a left eye from the left-eye input image 12*b*, and a learning model M3 for estimating a line of sight of a right eye from the right-eye input image 13*b*. The learning models M1 to M3 may be understood as one learning model.

The face input image 11*b* is input to the learning model M1. As described above, the input image 11*b* is an image acquired without performing the mirror reversal processing on the face extracted image 11*a*, and in the present embodiment, the extracted image 11*a* is applied as it is. First, the learning model M1 performs feature amount map extraction processing 21 regarding a face from the face input image 11*b* through the CNN, for example. Examples of the feature amounts include positions of a left eye, a right eye, a nose, and a mouth. Then, the learning model M1 performs calculation processing 22 of calculating a face direction from the extracted feature amount map. Data indicating the face direction calculated in the calculation processing 22 is supplied to each of an Attention mechanism 25 of the learning model M2 and an Attention mechanism 29 of the learning model M3. However, the Attention mechanism 29 of the learning model M3 is supplied with data in which a face direction is mirror-reversed in the left-right direction by performing mirror reversal processing 23 on the face direction calculated in the calculation processing 22.

The left-eye input image 12*b* is input to the learning model M2. As described above, the input image 12*b* is an image acquired without performing the mirror reversal processing on the left-eye extracted image 12*a*, and in the present embodiment, the extracted image 12*a* is applied as it is. First, the learning model M2 performs feature amount map extraction processing 24 regarding an eye from the left-eye input image 12*b* through the CNN, for example. As an example, in the extraction processing 24, a plurality of feature amounts necessary for realizing a function (in the case of the present embodiment, estimation of an eye direction) intended by the CNN is automatically configured as the feature amount map. In the extraction processing 24, a size, a width, and a direction of an eye, a position of a pupil (iris) in an eye, and the like may be added as auxiliary information for estimating an eye direction. Then, the learning model M2 generates a weighted feature amount map by weighting each feature amount with the Attention mechanism 25 with respect to the feature amount map extracted in the extraction processing 24, and performs calculation processing 26 of calculating a line of sight from this weighted feature amount map. In this manner, a line of sight is calculated in the learning model M2. The information processing apparatus 1 outputs information on the line of sight calculated by the learning model M2 as information 32 indicating an estimation result of the line of sight of the left eye (hereinafter, it may be referred to as left-eye line-of-sight estimation information). Here, in the learning model M2, a weight (weighting coefficient) given to the feature amount map in the Attention mechanism 25 is changed based on the data supplied from the learning model M1.

The right-eye input image 13*b* is input to the learning model M3. As described above, the input image 13*b* is an image acquired by performing mirror reversal processing 27 on the right-eye extracted image 13*a*. The learning model M3 is a model identical to the learning model M2, and specifically, a model structure and a weighting coefficient are common (identical) to those of the learning model M2. First, the learning model M3 performs feature amount map extraction processing 28 regarding an eye from the right-eye input image 13*b* through the CNN, for example. As an example, in the extraction processing 24, a plurality of feature amounts necessary for realizing a function (in the case of the present embodiment, estimation of an eye direction) intended by the CNN is automatically configured as the feature amount map. In the extraction processing 24, a size, a width, and a direction of an eye, a position of a pupil (iris) in an eye, and the like may be added as auxiliary information for estimating an eye direction. Then, the learning model M3 generates a weighted feature amount map by weighting each feature amount with the Attention mechanism 29 with respect to the extracted feature amount map, and performs calculation processing 30 of calculating a line of sight from this weighted feature amount map. In this manner, a line of sight is calculated in the learning model M3. The information processing apparatus 1 performs mirror reversal processing 31 on the line of sight calculated by the learning model M3 to mirror reverse the line of sight in the left-right direction, and outputs information on the line of sight after the mirror reversal as information 33 indicating an estimation result of the line of sight of the right eye (hereinafter, it may be referred to as right-eye line-of-sight estimation information). Here, in the learning model M3, a weight (weighting coefficient) given to the feature amount map in the Attention mechanism 29 is changed based on the data supplied from the learning model M1.

Figure 4:
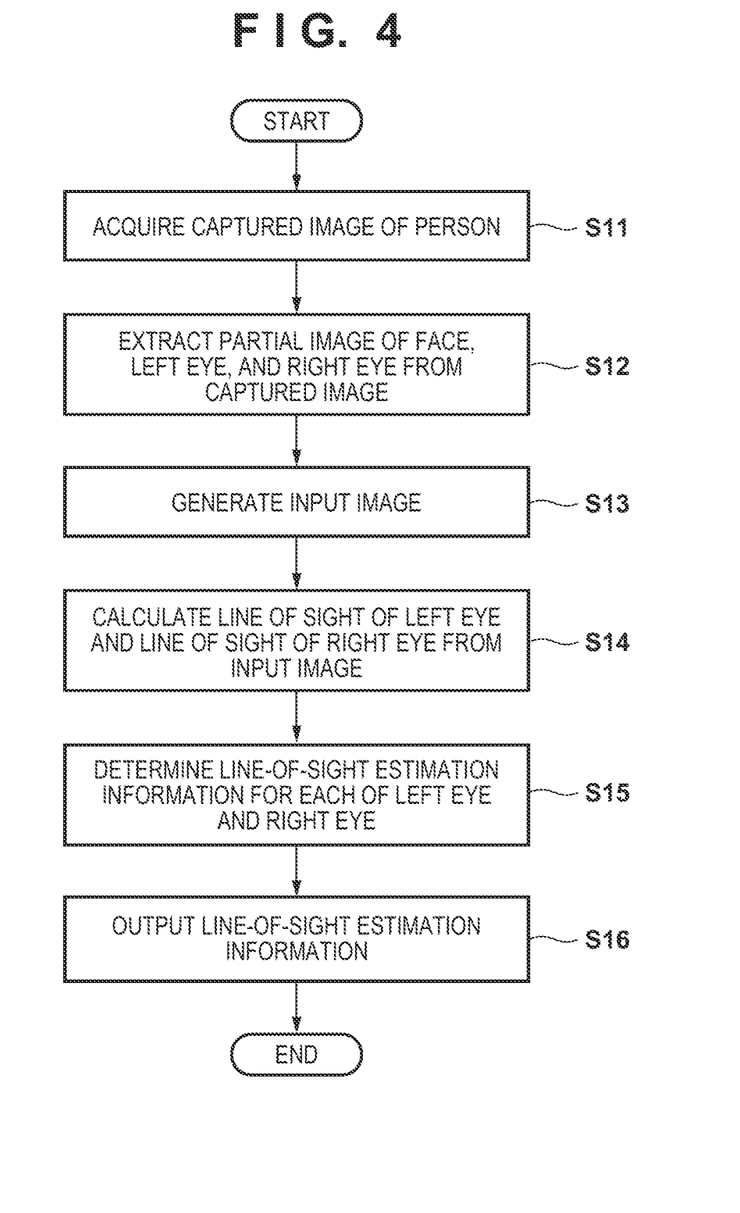
FIG. 4 is a flowchart illustrating estimation processing performed by an information processing apparatus.

Next, estimation processing performed by the information processing apparatus 1 according to the present embodiment will be described. FIG. 4 is a flowchart illustrating estimation processing performed by the information processing apparatus 1 according to the present embodiment.

In step S11, the information processing apparatus 1 (communication unit 1*b*) acquires the captured image 10 of a person from the photographing unit 2. Next, in step S12, the information processing apparatus 1 (generation unit 1*c*) applies a known image processing technique to the captured image 10 acquired in step S11 to extract, from the captured image 10, a partial image including a face of a person as the extracted image 11*a*, a partial image including a left eye of the person as the extracted image 12*a*, and a partial image including a right eye of the person as the extracted image 13*a*.

In step S13, the information processing apparatus 1 (generation unit 1*c*) generates input images to be input to the learning models M1 to M3 from the extracted images 11*a*, 12*a*, and 13*a* acquired in step S12. As described above, the information processing apparatus 1 performs the mirror reversal processing on one of the extracted images of the left-eye extracted image 12*a* and the right-eye extracted image 13*a* to generate an input image, and does not perform the mirror reversal processing on the other of the extracted images to generate an input image. In the case of the present embodiment, the information processing apparatus 1 generates the right-eye input image 13*b* by performing the mirror reversal processing on the right-eye extracted image 13*a*, and generates the left-eye input image 12*b* by using the extracted image 12*a* as it is without performing the mirror reversal processing on the left-eye extracted image 12*a*. In addition, the information processing apparatus 1 generates the face input image 11*b* by using the face extracted image 11*a* as it is without performing the mirror reversal processing on the face extracted image 11*a*.

In step S14, the information processing apparatus 1 (model calculation unit 1*d*) inputs the input images 11*b*, 12*b*, and 13*b* generated in step S13 to the learning models M1 to M3, thereby individually (independently) calculating the line of sight of the left eye and the line of sight of the right eye. The methods for calculating the line of sight of the left eye and the line of sight of the right eye are as described above with reference to FIG. 3. Next, in step S15, the information processing apparatus 1 (model calculation unit 1*d*) individually (independently) determines the line-of-sight estimation information for each of the left eye and the right eye based on the information on the line of sight of the left eye and the information on the line of sight of the right eye calculated in step S14. The information processing apparatus 1 performs the mirror reversal processing on one of the lines of sight of the left eye and the right eye subjected to the mirror reversal processing in step S13 to turn the reversal in the left-right direction back to an original state, thereby generating the line-of-sight estimation information of the one. In the case of the present embodiment, the information processing apparatus 1 performs the mirror reversal processing on the line of sight of the right eye calculated in step S14, and determines information on the line of sight after the mirror reversal as the right-eye line-of-sight estimation information. On the other hand, the mirror reversal processing is not performed on the line of sight of the left eye calculated in step S14, and the information on the calculated line of sight of the left eye is decided as the left-eye line-of-sight estimation information as it is. Next, in step S16, the information processing apparatus 1 outputs the left-eye line-of-sight estimation information and the right-eye line-of-sight estimation information determined in step S15 to the external device 3, for example.

Figure 5:
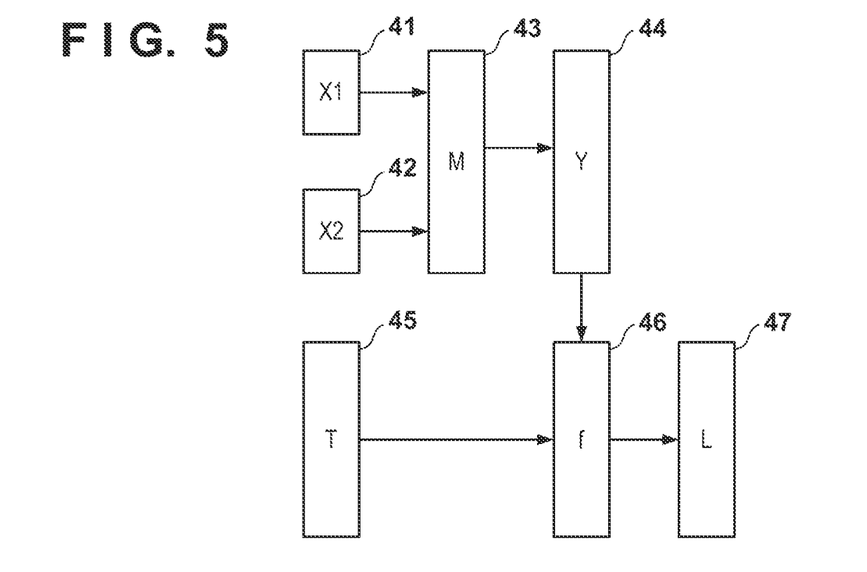
FIG. 5 is a conceptual diagram illustrating an input/output structure in machine learning.

Next, a learning method in the information processing apparatus 1 according to the present embodiment will be described. FIG. 5 is a conceptual diagram illustrating an input/output structure in machine learning for generating a learning model. Input data X1 (41) and input data X2 (42) are data of an input layer of a learning model 43. As the input data X1 (41), a face image (in the present embodiment, the face input image 11*b*) is applied. As the input data X2 (42), one of the images of the left eye and the right eye (in the present embodiment, the left-eye input image 12*b*) and/or the other of the images subjected to the mirror reversal processing (in the present embodiment, the right-eye input image 13*b*) is applied. In the present embodiment, since two images (left eye and right eye) acquired from one captured image 10 can be each applied as the input data X2, that is, two times of machine learning can be performed from one captured image 10, it is possible to improve learning accuracy (line-of-sight estimation accuracy) and learning efficiency of machine learning.

By inputting the input data X1 (41) and the input data X2 (42) to the learning model M (43), output data Y (44) as a calculation result of a line of sight is output from the learning model M (43). The learning model M (43) may be understood as including the learning models M1 and M2 in FIG. 3 or the learning models M1 and M3 in FIG. 3. Further, at the time of machine learning, teacher data T (45) is given as correct answer data of a line of sight calculated from the input data X, and the output data Y (44) and the teacher data T (45) are given to a loss function f (46), whereby a deviation amount L (47) from a correct answer of a line of sight is acquired. The learning model M (43) is optimized by updating coefficients (weighting coefficients) and the like of the learning model M (43) so that the deviation amount L is reduced with respect to a large number of pieces of learning data (input data).

Here, a measurement result of a line of sight of a person is used as the teacher data T (45). For example, for measurement of a line of sight of a person, the person is photographed by the photographing unit 2 in a state where the line of sight of the person is directed to a predetermined location (target location). The line of sight of the person at this time can be used as the teacher data T, a face image extracted from a captured image acquired by the photographing unit 2 can be used as the input data X1 (41), and an eye image extracted from the captured image can be used as the input data X2 (42).

Figure 6:
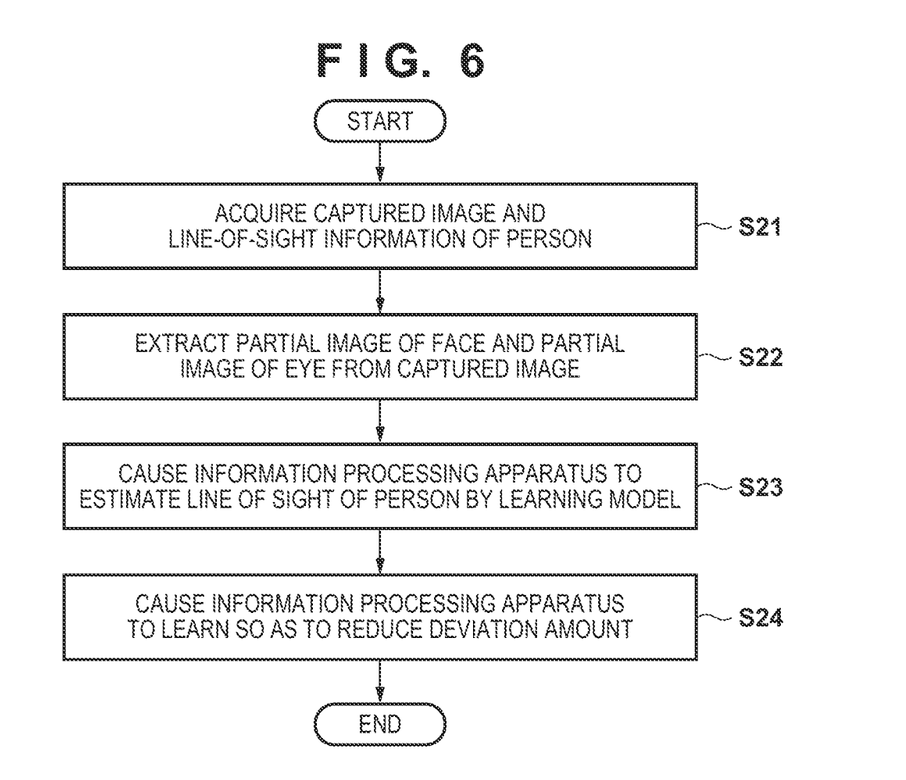
FIG. 6 is a flowchart illustrating a learning method in an information processing apparatus.

FIG. 6 is a flowchart illustrating the learning method in the information processing apparatus 1 according to the present embodiment.

In step S21, a captured image acquired by causing the photographing unit 2 to photograph a person and information on a line of sight of the person at that time are acquired. For example, as described above, by causing the photographing unit 2 to photograph a person with the line of sight of the person directed toward a predetermined location (target location), a captured image and information on a line of sight of a person can be acquired. The information on the line of sight of the person acquired in step S21 is used as the teacher data T (45).

In step S22, from the captured image acquired in step S21, a partial image of a face of a person is extracted as the input data X1 (41), and a partial image of an eye of a person are extracted as the input data X2 (42). Here, the input data X2 (42) may be a reversed image acquired by reversing the extracted partial image of an eye of a person in the left-right direction, or may be unreversed images acquired without reversing the extracted partial image of an eye of a person.

In step S23, based on the partial image of a face of a person extracted as the input data X1 (41) in step S22 and the partial image of at least one eye of a person extracted as the input data X2 (42), the information processing apparatus 1 is caused to estimate a line of sight of a person by the learning model M (43). A line of sight of a person estimated in this step corresponds to the output data Y (44) in FIG. 5. Next, in step S24, the information processing apparatus 1 is caused to learn so as to reduce the deviation amount L (47) between a line of sight of a person estimated as the output data Y (44) in step S23 and a line of sight of a person acquired as the teacher data T (45) in step S21.

As described above, the information processing apparatus 1 according to the present embodiment individually performs processing of estimating, by using a reversed image acquired by reversing one of the images of a left eye and a right eye of a person, a line of sight of the one (first processing), and processing of estimating, by using an unreversed image acquired without reversing the other of the images of the left eye and the right eye of the person, a line of sight of the other (second processing), by using a common learning model. As a result, machine learning when generating the common learning model can be performed using two images (left eye and right eye) acquired from one captured image 10, so that learning accuracy (line-of-sight estimation accuracy) and learning efficiency of machine learning can be improved.

In addition, the information processing apparatus 1 according to the present embodiment estimates a direction of a face of a person from an image of the face of the person by the learning model M1, and changes the coefficients of the learning model (M2 and/or M3) for estimating a line of sight of a person from an image of at least one eye of the person according to the direction of the face of the person estimated by the learning model M1. This makes it possible to accurately estimate a line of sight of a person that can be changed according to a direction of the face of the person.

Other Embodiments

In addition, a program for achieving one or more functions described in the above embodiment is supplied to a system or an apparatus through a network or a storage medium, and one or more processors in a computer of the system or the apparatus are capable of reading and executing the program. The present invention can be achieved by such an aspect as well.

Summary of Embodiments

1. An information processing apparatus according to the above embodiment is an information processing apparatus (e.g., 1) that estimates a line of sight of a person, the information processing apparatus including:
   a first calculation unit (e.g., 1*d*) that estimates a direction of a face of the person using a first model (e.g., M1) that outputs a calculation result of a direction of the face of the person when an image of the face of the person (e.g., 11*b*) is input; and
   a second calculation unit (e.g., 1*d*) that estimates the line of sight of the person using a second model (e.g., M2, M3) that outputs a calculation result of the line of sight of the person when an image of at least one eye of the person (e.g., 12*b*, 13*b*) is input,
   wherein the second calculation unit changes coefficients of the second model according to the direction of the face estimated by the first calculation unit.

According to this embodiment, it is possible to accurately estimate a line of sight of a person that can be changed according to a direction of a face of the person.

2. In the above embodiment,
   the second model includes an Attention mechanism (e.g., 25, 29) that weights a feature amount map of the image of the at least one eye, and
   the second calculation unit changes weighting coefficients in the Attention mechanism according to the direction of the face estimated by the first calculation unit.

According to this embodiment, it is possible to accurately estimate a line of sight of a person that can be changed according to a direction of a face of the person.

3. The above embodiment further comprises:
   an acquisition unit (e.g., 1*b*) that acquires an image of the person (e.g., 10) obtained by a photographing unit (e.g., 2); and
   a generation unit (e.g., 1*c*) that generates, from the image of the person acquired by the acquisition unit, the image of the face of the person (e.g., 11*b*) to be input to the first model and the image of the at least one eye of the person (e.g., 12*b*, 13*b*) to be input to the second model.

According to this embodiment, an image of a face and an image of at least one eye of a person can be acquired from one image of the person acquired by a photographing unit (camera), and the image of the person can be accurately estimated based on these images.

4. In the above embodiment,
   the second calculation unit inputs a reversed image (e.g., 13*b*) acquired by reversing the image of the at least one eye of the person to the second model (e.g., M3), and estimates the line of sight of the person based on information (e.g., 33) acquired by reversing line-of-sight information output from the second model.

According to this embodiment, a line of sight of a left eye and a line of sight of a right eye of a person can be estimated using a common model, and even in this case, the line of sight of the left eye and the line of sight of the right eye can be accurately estimated according to a direction of a face of the person.

5. In the above embodiment,
   the second calculation unit changes the coefficients of the second model according to the direction of the face acquired by reversing (e.g., 23) the direction of the face estimated by the first calculation unit.

According to this embodiment, in a case where a line of sight of a left eye and a line of sight of a right eye of a person are estimated using a common model, the line of sight of the left eye and the line of sight of the right eye can be accurately estimated according to a direction of a face of the person.

The invention is not limited to the foregoing embodiments, and various variations/changes are possible within the spirit of the invention.

What is claimed is:

1. An information processing apparatus that estimates a line of sight of a person, comprising:
   at least one processor with a memory comprising instructions, that when executed by the at least one processor, cause the at least one processor to at least:
      execute a first calculation of estimating a direction of a face of the person using a first model that outputs a calculation result of the direction of the face of the person when an image of the face of the person is input; and
      execute a second calculation of estimating the line of sight of the person using a second model that outputs a calculation result of the line of sight of the person when an image of at least one eye of the person is input,
   wherein the at least one processor is configured to change coefficients of the second model to be used in the second calculation, according to the direction of the face estimated in the first calculation.

2. The information processing apparatus according to claim 1, wherein
   the second model includes an Attention mechanism that weights a feature amount map of the image of the at least one eye, and
   the at least one processor is configured to change weighting coefficients in the Attention mechanism according to the direction of the face estimated in the first calculation.

3. The information processing apparatus according to claim 1, wherein the at least one processor is configured to:

acquire an image of the person obtained by a photographing unit; and generate, from the acquired image of the person, the image of the face of the person to be input to the first model and the image of the at least one eye of the person to be input to the second model.

4. The information processing apparatus according to of claim 1, wherein in the second calculation, the at least one processor is configured to input a reversed image acquired by reversing the image of the at least one eye of the person to the second model, and estimate the line of sight of the person based on information acquired by reversing line-of-sight information output from the second model.

5. The information processing apparatus according to claim 4, wherein in the second calculation, the at least one processor is configured to change the coefficients of the second model according to a direction of the face acquired by reversing the direction of the face estimated in the first calculation.

6. An information processing method for estimating a line of sight of a person, the method comprising:

executing a first calculation of estimating a direction of a face of the person using a first model that outputs a calculation result of a direction of a face when an image of the face of the person is input; and executing a second calculation of estimating a line of sight of the person using a second model that outputs a calculation result of a line of sight when an image of at least one eye of the person is input, wherein in the second calculation, coefficients of the second model are changed according to the direction of the face estimated in the first calculation.

7. A non-transitory computer-readable storage medium storing a program for causing a computer to execute an information processing method according to claim 6.

8. A learning method in an information processing apparatus that estimates a line of sight of a person, the learning method comprising:

extracting, from an image of the person, an image of a face of the person and an image of at least one eye of the person;

estimating the line of sight of the person based on the extracted image of the face and the extracted image of the at least one eye;

acquiring information on the line of sight of the person when the image of the person is acquired, as teacher data; and learning so as to reduce a deviation amount between the line of sight of the person estimated in the estimating and the line of sight of the person acquired in the acquiring as the teacher data.

9. A non-transitory computer-readable storage medium storing a program for causing a computer to execute a learning method according to claim 8.

* * * * *